United States Patent
Liang

(10) Patent No.: US 7,645,122 B1
(45) Date of Patent: Jan. 12, 2010

(54) TURBINE ROTOR BLADE WITH A NESTED PARALLEL SERPENTINE FLOW COOLING CIRCUIT

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 439 days.

(21) Appl. No.: 11/607,587

(22) Filed: Dec. 1, 2006

(51) Int. Cl.
*F01D 5/18* (2006.01)
(52) U.S. Cl. .................................................. 416/97 R
(58) Field of Classification Search .................. 415/115; 416/92, 96 R, 97 R
See application file for complete search history.

(56) References Cited

U.S. PATENT DOCUMENTS

| | | | |
|---|---|---|---|
| 3,533,712 A | 10/1970 | Kercher | |
| 4,753,575 A * | 6/1988 | Levengood et al. | 416/97 R |
| 4,820,122 A | 4/1989 | Hall et al. | |
| 5,403,157 A * | 4/1995 | Moore | 416/96 R |
| 5,403,159 A | 4/1995 | Green et al. | |
| 5,591,007 A | 1/1997 | Lee et al. | |
| 5,669,759 A | 9/1997 | Beabout | |
| 5,873,695 A | 2/1999 | Takeishi et al. | |
| 6,036,436 A | 3/2000 | Fukuno et al. | |
| 6,139,269 A | 10/2000 | Liang | |
| 6,220,817 B1 * | 4/2001 | Durgin et al. | 416/97 R |
| 6,257,830 B1 | 7/2001 | Matsuura et al. | |
| 6,273,682 B1 * | 8/2001 | Lee | 416/97 R |
| 6,481,967 B2 | 11/2002 | Tomita et al. | |
| 6,491,496 B2 | 12/2002 | Starkweather | |
| 6,832,889 B1 * | 12/2004 | Lee et al. | 415/115 |
| 6,988,872 B2 | 1/2006 | Soechting et al. | |
| 7,118,325 B2 | 10/2006 | Kvasnak et al. | |
| 2006/0051208 A1 * | 3/2006 | Lee et al. | 416/97 R |

* cited by examiner

*Primary Examiner*—Edward Look
*Assistant Examiner*—Ryan H Ellis
(74) *Attorney, Agent, or Firm*—John Ryznic

(57) ABSTRACT

A turbine airfoil used in a gas turbine engine, the airfoil including an internal cooling air circuit that includes two nested and parallel serpentine flow circuits that both flow in the airfoil aft direction. The first and second legs of the two nested serpentine circuits are separated by ribs so that the cooling air flows do not mix. The last leg of the two nested serpentine circuits is separated by a rib which includes a plurality of cross-over holes so that the flows can mix. The aft-most serpentine flow circuit of the two nested circuits includes a last leg that is connected to cooling slots spaced along the trailing edge of the airfoil such that cooling air from the last leg flows out the ducts. The forward-most serpentine circuit of the two nested circuits includes a blade tip channel extending along the blade tip and connecting the first leg with the second leg, the blade tip channel including a plurality of blade tip cooling holes. A leading edge cooling supply channel is connected to at least one impingement cavity by leading edge impingement holes to provide cooling to the leading edge region. The leading edge cooling supply channel is separated from the forward-most serpentine flow circuit by a rib such that the flows do not mix.

13 Claims, 4 Drawing Sheets

TURBINE ROTOR BLADE WITH A NESTED PARALLEL SERPENTINE FLOW COOLING CIRCUIT

BACKGROUND OF THE INVENTION

1. Field of the Invention

The present invention relates generally to fluid reaction surfaces, and more specifically to a turbine airfoil with cooling circuits.

2. Description of the Related Art Including Information Disclosed Under 37 CFR 1.97 and 1.98

In a gas turbine engine, such as an industrial gas turbine (IGT) engine, stator vanes and rotor blades (both airfoils) used in the turbine air cooled by passing pressurized air from the compressor through a complex shaped internal cooling circuit within the airfoil. The efficiency of the engine can be increased by allowing for a higher gas flow temperature entering the turbine, or by using less cooling air to cool the airfoils.

FIG. 1 shows a prior art first stage rotor blade external pressure profile. The forward region of the pressure side surface experiences a high hot gas static pressure while the entire suction side of the airfoil is at a much lower hot gas static pressure than on the pressure side. On the pressure side of the airfoil, the pressure profile increases from the leading edge to a high point just downstream from the leading edge, and then drops in the direction toward the trailing edge. On the suction side of the airfoil, the pressure profile shows the highest pressure to be at the leading edge, and a significant drop in pressure just past the leading edge to a low point at about mid-chord length with the pressure increasing toward the trailing edge. Most of the pressure on the suction side is below the lowest pressure found on the pressure side as indicated in FIG. 1.

U.S. Pat. No. 6,988,872 B2 issued to Soechting et al on Jan. 24, 2006 and entitled TURBINE MOVING BLADE AND GAS TURBINE shows this serpentine cooling circuit is reproduced in FIG. 2 of the present application and shows a prior art rotor blade with a (1+3+3) serpentine flow cooling circuit for the first stage blade. For the first forward flowing triple pass (also referred to as a three-pass) serpentine flow cooling circuit used in the airfoil mid-chord region, the cooling air flows in the forward direction and discharges into the high hot gas side pressure section of the pressure side. In order to satisfy the backflow margin criteria, a high cooling supply pressure is needed for the prior art cooling circuit of FIG. 2. The high pressure requirement induces a high leakage flow. Since the last up-pass of the triple pass serpentine cavities provide film cooling air for both sides of the airfoil, in order to satisfy the back flow margin criteria for the pressure side film row, the internal cavity pressure must be approximately 10% higher than the pressure side hot gas side which will result in an over-pressuring of the airfoil suction side film cooling holes. For the second aft flowing triple pass serpentine flow cooling design used in the airfoil mid-chord region, the cooling air flows forward and discharges into the airfoil trailing edge to provide cooling for the airfoil trailing edge region.

Another prior art reference, U.S. Pat. No. 4,820,122 issued to Hall et al on Apr. 11, 1989 and entitled DIRT REMOVAL MEANS FOR AIR COOLED BLADES discloses an internally cooled turbine blade in FIG. 1 of this patent with a two passages (28 and 30 in this patent) that are adjacent and parallel and form the first and second legs of a serpentine flow passage, but share a third leg in which the two passages merge into the third leg. These two passages are not separate from each other. Also, the flow direction in this patent is from trailing edge to leading edge, the opposite direction of the hot gas flow through the turbine.

U.S. Pat. No. 6,220,817 B1 issued to Durgin et al on Apr. 24, 2001 and entitled AFT FLOWING MULTI-TIER AIRFOIL COOLING CIRCUIT discloses a turbine airfoil with two serpentine flow cooling passages arranged one above the other in which an outer inlet channel (40b in this patent) extends to the blade tip and then into a first serpentine flow circuit in the upper portion of the blade and a inner inlet channel (40a in this patent) than extends about halfway up and then flows into a second serpentine flow circuit in the lower portion of the blade. The two serpentine flow circuits are separated by ribs so that no cross-flow of cooling air occurs, and both discharge through blade tip cooling holes. U.S. Pat. No. 5,591,007 issued to Lee et al on Jan. 7, 1997 and entitled MULTI-TIER TURBINE AIRFOIL discloses a similar cooling circuit arrangement to the above Durgin patent.

U.S. Pat. No. 5,403,159 issued to Green et al on Apr. 4, 1995 and entitled COOLABLE AIRFOIL STRUCTURE discloses a turbine airfoil with a cooling circuit with a passage (82 to 86 in this patent) that includes a rib with a curved top end that breaks the channel into two separate channels. However, the channel is not two separate serpentine channels as is the applicant's present invention.

It is therefore an object of the present invention to provide for a new serpentine flow cooling circuit that can be used in a rotor blade, especially for the mid-chord and trailing edge regions of the blade, in which the above described disadvantages are reduced or eliminated.

BRIEF SUMMARY OF THE INVENTION

A turbine rotor blade used in a gas turbine engine, inc which the blade includes a serpentine flow cooling circuit comprised of two nested and parallel serpentine flow cooling circuits to provide cooling for the blade mid-chord and trailing edge regions. The serpentine flow cooling circuit includes two separate triple pass serpentine flow cooling circuits at the blade mid-chord region. Both triple pass serpentine flow circuits are flowing in the aft direction to provide for the cooling of the trailing edge region. The aft flowing serpentine flow circuit used for the airfoil mid-chord region will maximize the use of cooling air to the main stream gas side pressure potential as well as to tailor the airfoil external heat load. The cooling air is supplied at the airfoil forward section where the airfoil heat load is low and therefore eliminating the need for film cooling. The spent cooling air is discharged at the aft section of the airfoil where the gas side pressure is low, and therefore yields a high cooling air to main stream pressure potential to be used in the serpentine channels to maximize the internal cooling supply pressure requirement for the serpentine flow circuit. Also, the serpentine flow circuit yields a lower cooling supply pressure requirement and lower leakage flow. The last leg of both aft flowing triple pass serpentine flow circuits are mated together to form a concurrent flow channel separated with a structural rib with cross-over holes.

BRIEF DESCRIPTION OF THE SEVERAL VIEWS OF THE DRAWINGS

FIG. 2b shows a diagram of the cooling circuit in FIG. 2a.

FIG. 3b shows a diagram of the serpentine flow circuit of FIG. 3a.

DETAILED DESCRIPTION OF THE INVENTION

The present invention is a rotor blade used in a gas turbine engine. The engine can be an aero engine used in an aircraft or an industrial gas turbine (IGT) engine used to produce electric power. The cooling circuit of the present invention can also be used in a stator vane of either type of engine.

Figure 1:
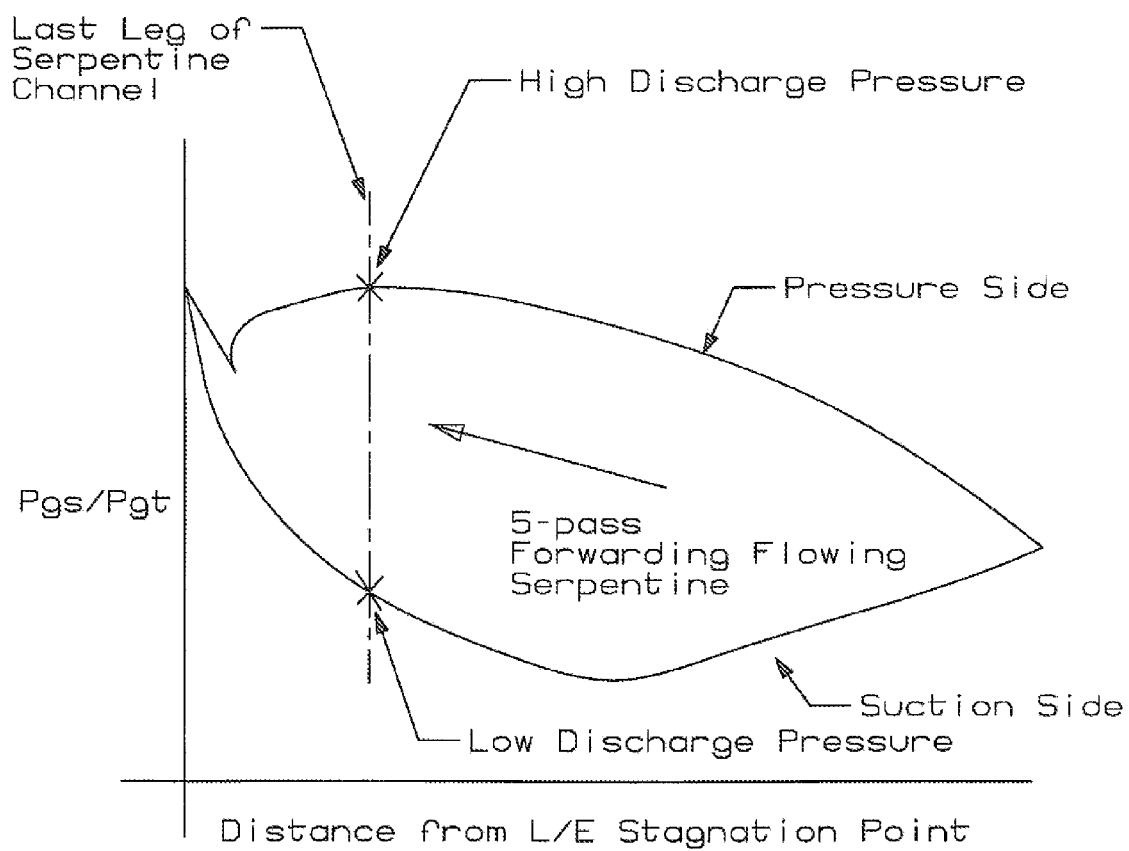
FIG. 1 shows a prior art turbine rotor blade external pressure profile around the pressure side and the suction side of the blade.
Figure 2A:
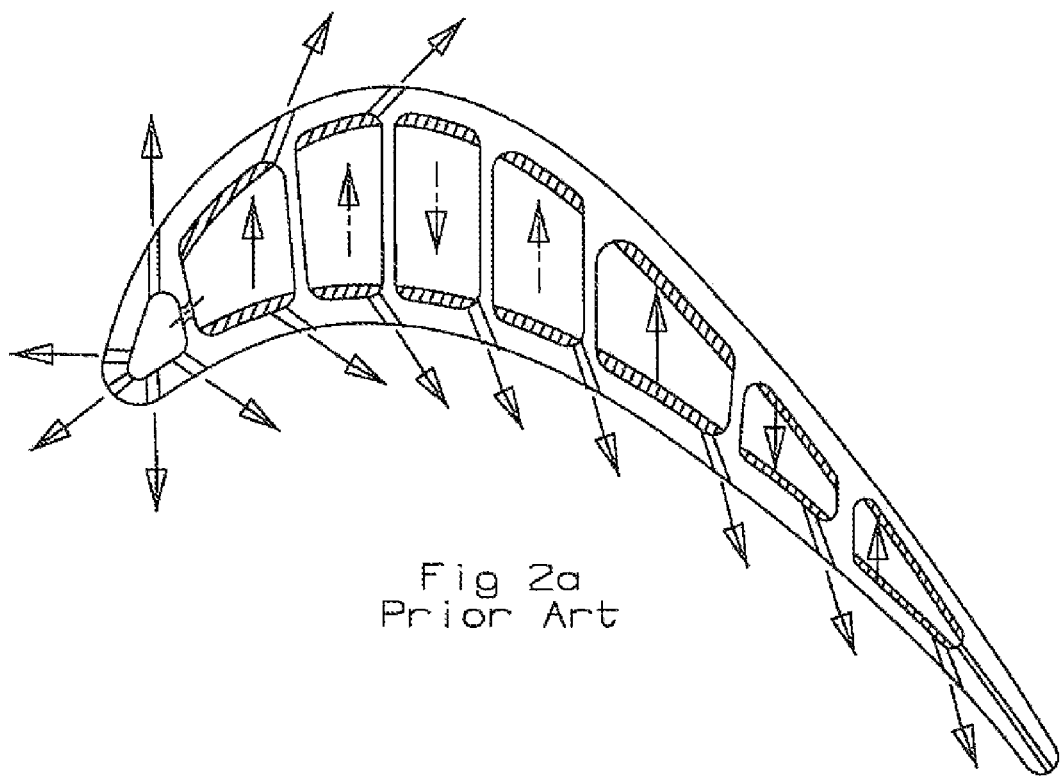
FIG. 2a shows a top view of a prior art twin serpentine flow cooling circuit.
Figure 2B:
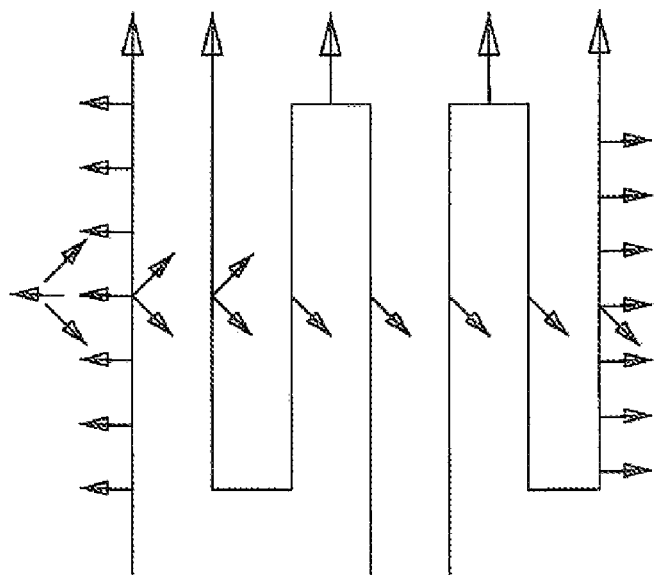
Figure 3A:
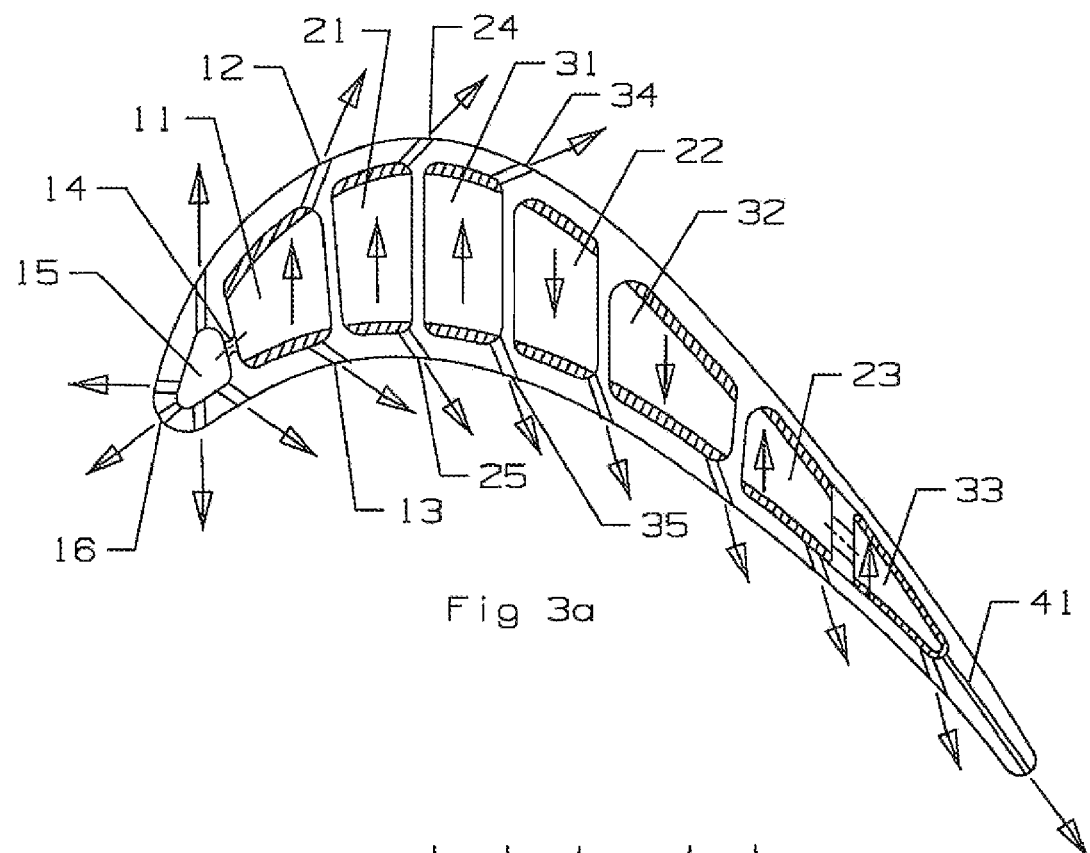
FIG. 3a shows a top view of the nested and parallel serpentine flow cooling circuit of the present invention.

FIG. 3a shows a top view of the rotor blade of the present invention. the leading edge portion includes a showerhead cooling arrangement of the prior art. A cooling supply channel 11 delivers compressed air from the compressor of the engine for cooling the leading edge region. A row of suction side film cooling holes 11 and a row of pressure side film cooling holes 13 are connected to the cooling air supply channel 11 to provide film cooling for the blade. The cooling supply channel 11 is also connected to the showerhead impingement cavity 15 through a plurality of metering holes 14. the impingement cavity 15 is connected to the showerhead film cooling holes 16 arranged along the leading edge for film cooling thereof.

Downstream in the hot gas flow direction from the leading edge cooling circuit described above is the nested and parallel serpentine flow cooling circuit of the present invention. This includes a pair of first up-pass cooling channels 21 and 31 located adjacent to each other and extending from the pressure side to the suction side walls of the blade. The forward first up-pass channel 21 includes a row of suction side film cooling holes 24 and a row of pressure side film cooling holes 25, both rows being connected to the channel 21 to discharge cooling air to the blade surface. The aft first up-pass channel 31 also includes rows of film cooling holes on the suction side 34 and the pressure side 35 to discharge film cooling air to the blade surface.

A pair of first down-pass cooling channels 22 and 32 is located adjacent to each other and downstream from the pair of first up-pass channels 21 and 31. The first down-pass channels 22 and 32 each include a row of pressure side film cooling holes to discharge film cooling air from these channels to the pressure side surface of the blade. If desired and warranted, rows of suction side film cooling holes connected to the channels 22 and 32 can also be included, or a row of film cooling holes in either channel 22 or channel 32.

A pair of second up-pass cooling channels 23 and 33 is located adjacent to each other and downstream from the first down-pass channels 22 and 32. The two second up-pass channels 23 and 33 include each a row of film cooling holes on the pressure side to discharge film cooling air to the pressure side of the blade. If desired and warranted, rows of suction side film cooling holes connected to the channels 23 and 33 can also be included, or a row of film cooling holes in either channel 23 or channel 33.

Figure 3B:
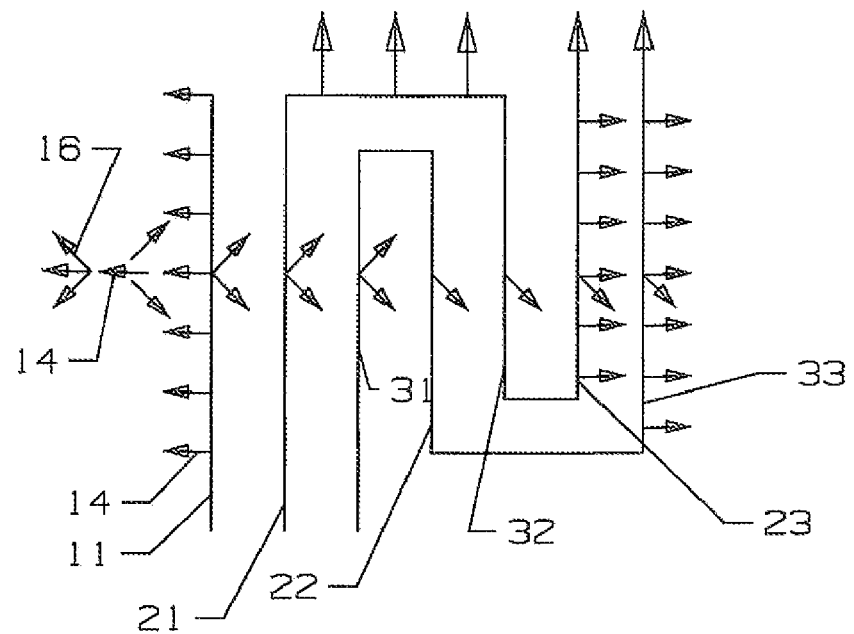
Figure 4:
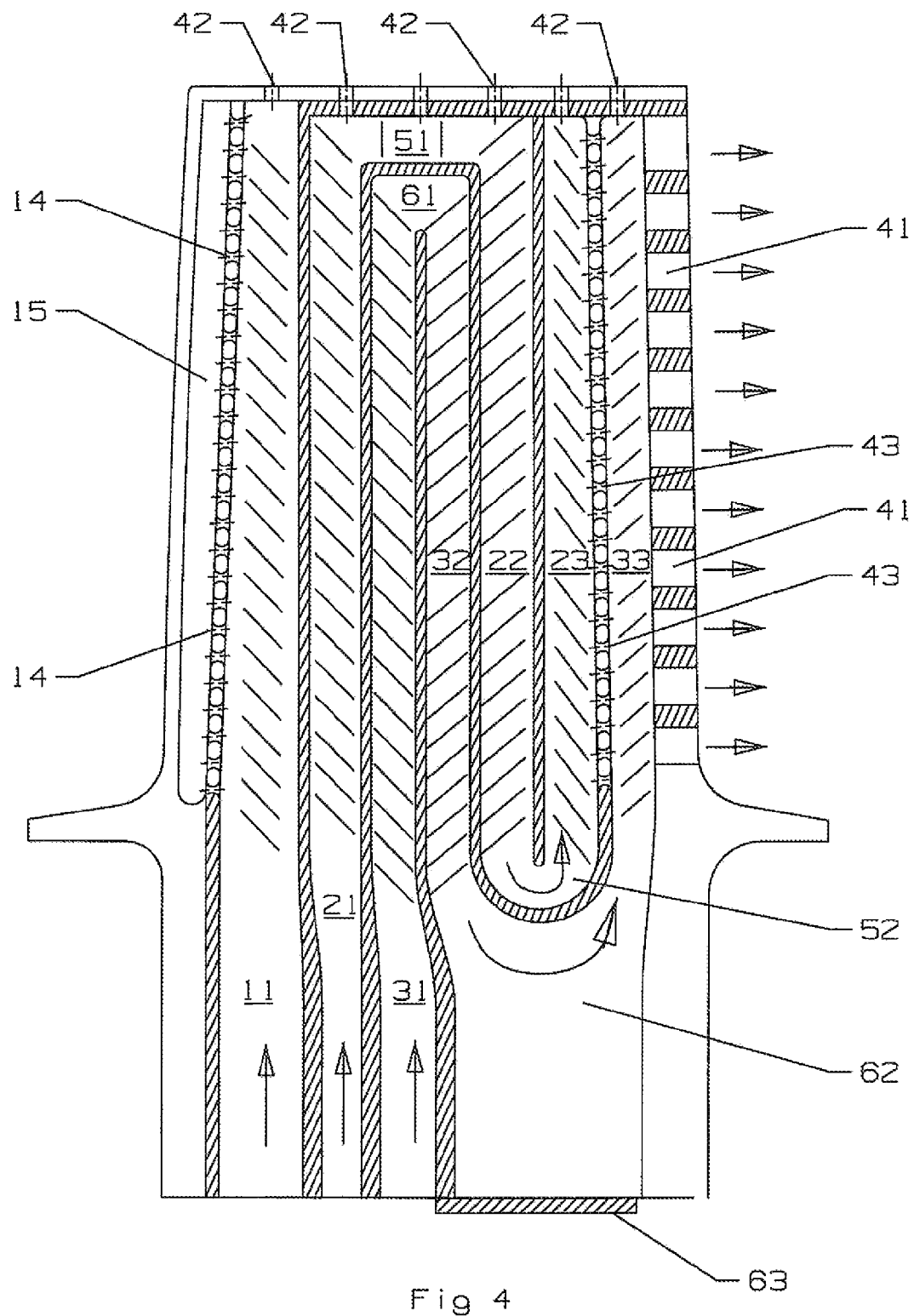
FIG. 4 shows a cross section view of the side of the nested parallel serpentine flow circuit of the present invention.

FIG. 3b shows a diagram of the cooling circuit of the present invention with the leading edge cooling supply channel 11, metering holes 14 and film cooling holes 16, and the nested and parallel serpentine flow cooling channels described with respect to FIG. 3a. FIG. 4 shows that forward first up-pass channel 21 being connected to the first down-pass channel 22 by a first blade tip channel 51 located just below the blade tip. The aft first up-pass channel 31 is connected to the aft first down-pass channel 32 by a second blade tip channel 61 located between the first blade tip channel 51 and a rib separating the channels 31 and 32. The second blade tip channel 61 is basically a U-turn channel. A U-turn channel 52 connects the forward first down-pass channel with the forward second up-pass channel to form the first serpentine flow cooling passage comprising the channels 21, 22 and 23. A cavity 62 formed in the root portion of the blade and closed by a cover plate 63 forms another U-turn channel than connects channels 32 and 33 to form the second serpentine flow cooling passage comprising the channels 31, 32 and 33.

The channels 23 and 33 that form the last legs of the two nested serpentine flow cooling circuits are connected through a plurality of cross-over holes 43 formed in a rib that separates the two channels 23 and 33. The channel 33 that forms the last leg of the second serpentine flow passage is connected to a row of trailing edge cooling slots 41 that discharge the cooling air from the channel 33 to the trailing edge of the blade. Tip cooling holes 42 are also used in the leading edge cooling supply channel, in the first U-turn channel 51, and in the ends of the channels 23 and 33 that form the last leg of the serpentine flow passages as seen in FIG. 4 to cool the blade tip region. Positioned along the channels in the cooling circuit are trip strips to promote turbulent flow as the cooling air passes through the channels.

The cooling circuit of the present invention thus includes a pair of nested and parallel serpentine flow cooling passages that pass through the mid-chord and trailing edge regions of the blade. The first of these two serpentine flow passages comprises channels 21, 51, 22, 52, and 23 to form the first triple pass (or, three-pass) serpentine flow circuit. The second of these two serpentine flow passages comprises channels 31, 61, 32, 62, and 33 to form the second triple pass serpentine flow circuit.

Operation of the cooling circuit of the present invention is now described with respect to FIG. 4. Pressurized air from an outside source, such as a compressor of the gas turbine engine, is delivered through the blade root into channels 11, 21 and 31 to deliver cooling air to the showerhead cooling holes 16 and the two nested serpentine flow cooling passages. Cooling air delivered to the leading edge cooling supply channel 11 passes through the metering and impingement holes 14 to provide impingement cooling for the leading edge of the blade. Film cooling air is discharged onto the leading edge through the showerhead film cooling holes 16 as seen in FIG. 3a. Cooling air also is discharged from the leading edge cooling supply channel 11 through hole 42 on the tip of the blade. Pressurized air supplied to the channel 21 flows up the first leg, around the turn 51, down the second leg 22, around the turn 52, and then up the last leg 23, and then through the cross-over holes 43 and into the adjacent channel 33 or through the blade tip hole 42 at the end of the channel 23. pressurized air delivered to the channel 31 flows up the first leg and around the turn 61, down the second leg 32, around the turn 62, and then up the last leg channel 33 to be merged with the cooling air flowing through the cross-over holes 43 and then discharged through the cooling slots 41 along the trailing edge or out through the tip hole 42 at the end of the channel 33. The trip strips positioned along the channels promote heat transfer from the walls to the cooling air.

The two nested serpentine flow cooling circuits are disclosed above as having only three legs in each serpentine flow circuit. However, the two nested serpentine flow circuits can have at least three legs and still not depart from the spirit and scope of the present invention. Two nested 5-pass serpentine flow circuits can be used in which the last legs—the fifth legs—include a separating rib with cross-over holes. For purposes of defining the language in the claims, a three-pass or triple pass serpentine flow circuit is considered to include a four or five pass serpentine flow circuit since the four and five pass circuits comprise three legs.

One additional embodiment of the FIG. 4 invention is to not use the plate cover 63 on the cavity that forms the turn 62 and use this cavity as a cooling air supply passage to add additional cooling air to the inner serpentine circuit 31-33 of the two nested serpentine flow circuits. Instead of removing the cover plate 63, a hole can be formed in the plate 63 to allow additional cooling air to enter the cavity 62. Because the first and second legs of the nested serpentine circuits are separated by continuous ribs, the supply pressures for the serpentine flow circuits can be different in order to further control the cooling air flow and pressure for desired cooling abilities. Supply air into the cavity 62 can add additional cooling air to the trailing edge passage 33 and tip hole 42.

I claim the following:

1. A turbine rotor blade for use in a gas turbine engine, the blade comprising:
    a root portion;
    an airfoil portion extending from the root portion;
    a blade tip portion;
    a leading edge cooling supply channel;
    an impingement cavity adjacent to the leading edge of the blade and in fluid communication with the leading edge supply channel by a plurality of impingement holes;
    a first triple-pass serpentine flow cooling circuit having a first leg adjacent to the leading edge cooling supply cavity and separated from the supply channel by a continuous rib;
    a second triple-pass serpentine flow cooling circuit nested within the first triple-pass serpentine flow cooling circuit, the two nested serpentine flow cooling circuits being separated by a continuous rib extending along the legs of the serpentine flow circuit;
    a plurality of cooling slots arranged along the trailing edge of the blade, the slots being in fluid communication with the last leg of the second triple-pass serpentine flow circuit; and,
    blade tip cooling holes in fluid communication with the leading edge cooling channel, the first triple-pass serpentine flow circuit, and the last legs of the two nested serpentine flow circuits to provide cooling to the blade tip portion.

2. The turbine rotor blade of claim 1, and further comprising:
    the continuous rib extending along the first and second legs of the two nested serpentine flow circuits does not allow the cooling air flow to mix; and,
    the continuous rib extending along the last leg of the serpentine flow circuit includes a plurality of cross-over holes to allow the cooling air flow to mix.

3. The turbine rotor blade of claim 1, and further comprising:
    the leading edge cooling supply channel and the two nested serpentine flow circuits are formed by channels that extend between the pressure side wall and the suction side wall of the blade; and,
    the channels include trip strips to promote turbulent flow within the cooling air flow through the channels.

4. The turbine rotor blade of claim 1, and further comprising:
    the nested triple-pass serpentine flow circuits extend substantially along the entire airfoil portion of the blade.

5. The turbine rotor blade of claim 1, and further comprising:
    the leading edge cooling supply channel and the first legs of the two nested serpentine flow circuits each include a row of film cooling holes on the pressure side and the suction side of the blade.

6. The turbine rotor blade of claim 5, and further comprising:
    the second legs of the two nested serpentine flow circuits each include a row of film cooling holes on the pressure side of the blade.

7. The turbine rotor blade of claim 6, and further comprising:
    the third legs of the two nested serpentine flow circuits each include a row of film cooling holes on the pressure side of the blade.

8. A turbine airfoil used in a gas turbine engine, the airfoil having a leading edge and a trailing edge, the airfoil also having a pressure side and a suction side and an internal cooling air passage to provide cooling for the airfoil, the turbine airfoil comprising:
    two triple-pass serpentine flow cooling circuits nested together and in parallel along substantially the entire airfoil portion;
    the two nested serpentine flow cooling circuits are separated by substantially radial extending ribs; and,
    the rib in the third legs of the two nested serpentine flow circuits include a plurality of cross-over holes to allow for the cooling air from one of the nested circuits to cross over into the other of the two nested circuits.

9. The turbine airfoil of claim 8, and further comprising:
    the two triple-pass serpentine flow cooling circuits are both aft flowing circuits.

10. The turbine airfoil of claim 8, and further comprising:
    the last legs of the nested serpentine flow cooling circuits each comprises at least one blade tip cooling hole to discharge cooling air from the respective last leg to the blade tip.

11. The turbine airfoil of claim 8, and further comprising:
    the forward-most serpentine circuit of the two nested serpentine flow circuits includes a blade tip channel extending along the blade tip and connecting the first leg to the second leg of the serpentine flow circuit.

12. The turbine airfoil of claim 11, and further comprising:
    the blade tip channel includes a plurality of blade tip cooling holes to discharge cooling air from the serpentine flow circuit to the blade tip.

13. The turbine airfoil of claim 8, and further comprising:
    a plurality of cooling slots arranged along the trailing edge of the airfoil and in fluid communication with the last leg of the aft-most serpentine flow circuit of the two nested serpentine flow circuits such that cooling air from the last leg flows out the slots.

* * * * *